Sept. 22, 1959 S. E. BENDER ET AL 2,905,560
METHODS AND MEANS FOR HANDLING MILK
Filed May 20, 1957
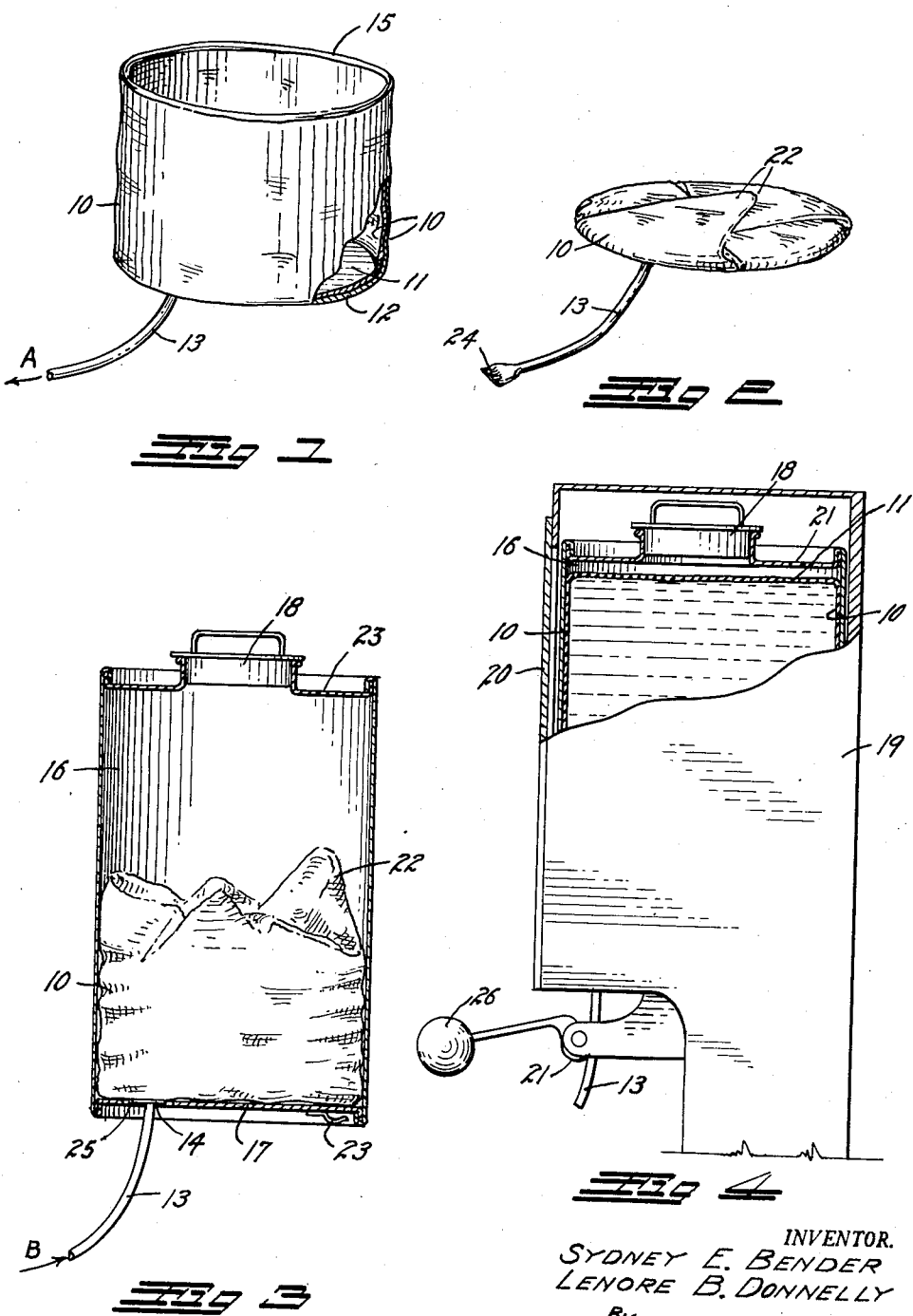
INVENTOR.
SYDNEY E. BENDER
LENORE B. DONNELLY

United States Patent Office 2,905,560
Patented Sept. 22, 1959

2,905,560

METHODS AND MEANS FOR HANDLING MILK

Sydney E. Bender and Lenore B. Donnelly, Denver, Colo.

Application May 20, 1957, Serial No. 660,395

2 Claims. (Cl. 99—151)

This invention relates to a method and means for hygienically handling and dispensing milk, and has for its principal object the provision of a method, and means for carrying out the method, whereby milk can be handled from its place of origin to its place of disposition without exposure to the atmosphere, so as to prevent exposure to air-borne contamination.

Another object of the invention is to provide a flexible, foldable, storable, marketable, and easily used liner for milk containers from which all air has been evacuated; which will remain sealed until connected to a source of milk supply; which will be expanded by the entering milk; and which can be again sealed after filling, with assurance that no air will be entrapped therein.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved liner as it would appear during an evacuation step in the improved method;

Fig. 2 is a perspective view of the improved liner completely evacuated, folded and sealed and ready for delivery to dairies and other customers;

Fig. 3 is a vertical section through a container illustrating the improved liner as it would appear therein when being filled with milk;

Fig. 4 is a side view, partly broken away, of a conventional restaurant-type milk dispenser, showing the container of Fig. 3 and a completely filled liner of Fig. 2 in place therein.

In carrying out the objects of this invention, a substantially cylindrical, sealed liner of flexible vinyl plastic sheeting is employed. The thickness of the vinyl sheeting has been greatly exaggerated on the drawing for the purposes of illustration. Actually, the sheeting is of a completely transparent type having a wall thickness in the neighborhood of .0025 inch.

The liner comprises a flexible, endless side wall 10 closed at its top with a substantially circular flexible top disc 11 and closed at its bottom with a similar flexible circular bottom disc 12. The extremities of the sheet forming the endless side wall 10 are heat-sealed together, and the top disc 11 and the bottom disc 12 are similarly heat-sealed to the top and bottom edges of the side wall 10 so that when fully expanded the liner will be cylindrical in shape.

A tube 13 of vinyl plastic communicates with the interior of the liner. The tube 13 is formed with a terminal plastic flange 14 which is heat-sealed about an opening in the bottom disc 12 of the liner.

In preparing the liner for shipment to various users, the tube 13 is connected to a vacuum source and the air is completely evacuated from the interior of the cylindrical liner. As the air evacuates therefrom, the upper half of the liner is telescopically forced into the lower half thereof by atmospheric pressure so as to form a medial annular fold 15 therein. The evacuation is continued until the top disc 11 rests snugly against the bottom disc 12 and the downwardly and inwardly folded upper portion of the side wall 10 rests snugly within and against the entire surface of the lower portion of the side wall so as to completely evacuate the air between the two portions so as to form a circular, vertical-sided, double-walled bowl, as shown in Fig. 1.

When the evacuation has been completed, and while the tube 13 is still connected to the vacuum source, the tube 13 is squeezed together and heat-sealed, as shown at 24 in Fig. 2. The cylindrical sides of the bowl-shaped liner of Fig. 1 are folded inwardly, the folding being accomplished by folding two opposite sides inwardly, leaving two triangular portions 22 upstanding. These two triangular portions 22 are then folded inwardly over the previously folded sides to form a perfectly flat, circular package, as shown in Fig. 2. The folded, evacuated liners are exceedingly thin and can be piled and packed in large numbers, without excessive bulk.

When received at the dairy or other user, the liners are placed in cylindrical containers of any desired types, such as shown at 16 in Figs. 3 and 4. The container illustrated is formed with an indented bottom plate 17 and with a removable top lid 18. The diameter and length of the container is such as to receive the liner when the latter is fully expanded.

The flat, folded liner is inserted into the containers 16 by removal of the lid 18 and the tube 13 is extended through a passage hole 25 formed in the bottom 17. The tube 13 is then squeezed closed so as to prevent the entrance of air to the liner, and the sealed extremity is cut away. The open extremity of the tube 13 is then fitted over a milk-supply nipple (not shown) and then squeezed to allow the milk to flow into the liner without the admission of air thereto.

The milk is now allowed to flow through the tube 13, as indicated by the arrow "B" in Fig. 3. As the milk enters the liner it will force the telescopically folded upper portion thereof upwardly so as to unfold the triangular folds 22, as shown in Fig. 3. The filling is continued until the liner is completely filled with milk, at which time the plastic tube 13 is again heat-sealed, similarly to the seal shown at 24 in Fig. 2.

The container 16 is now shipped to the final user, where the milk can be dispensed through the tube 13 in any desired manner. As the milk flows from the tube, the liner collapses under atmospheric pressure so that the liner will follow the descending milk level without admitting air to the milk.

A conventional dispenser, such as used in restaurants and the like, is indicated at 19 in Fig. 4. Such a dispenser is provided with a front door 20 through which the milk container 16 may be inserted. When in place, the tube 13 is extended downwardly through an eccentric tube-squeezing valve 21 actuated by means of a weight 26. It can be seen that each time the weight 26 is lifted, milk will flow through the tube 13, causing the liner to gradually collapse to follow the decreasing volume of milk, without the admission of air.

In order to prevent the formation of a partial vacuum in the upper portion of the container 16, the latter must be provided with an air bleed opening, either in the lide 18 or as indicated at 23 in the top of the container 16.

One of the most valuable features of the invention is the step wherein the interior of the liner is completely evacuated so that the upper half thereof rests snugly within the lower half thereof to form a vertical-walled bowl which can be compactly folded into a thin, flat package. A second feature is the sealing of the tube 13 against the entrance of air before it is disconnected from the source of vacuum, and maintaining this seal until the tube is connected with the source of milk, without ever opening the tube 13 to the atmosphere.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hygienic method of packaging milk comprising: evacuating the air through a flexible tube from a cylindrical, flexible, vinyl plastic inner container until the latter is collapsed so that the wall portions thereof come in contact to eliminate all internal space; sealing the extremity of said flexible tube while the latter is connected to the source of evacuation; placing the collapsed inner container in a rigid outer container with the sealed tube extending through the bottom of said rigid container; squeezing said tube to close the latter; cutting away the sealed extremity of the closed tube; connecting said closed tube to a milk supply; opening the closed tube; allowing the milk supply to flow through said tube into said inner container until the latter is fully expanded in said outer container; thence again sealing the extremity of said flexible tube while the latter is connected to said milk supply so that the interior of said inner container is never open to atmospheric contamination.

2. A hygienic liner for milk containers comprising: a normally cylindrical, completely sealed container formed from flexible vinyl plastic, the upper half of said container being folded downwardly into the enclosure of the lower half thereof to form a bowl-like shape, the sides of said bowl being folded inwardly to form a flat package; and a sealed flexible tube extending from the bottom of said folded container, all air being evacuated from the interior of said container, and said tube being sealed at its extremity to prevent atmospheric contamination of said liner.

References Cited in the file of this patent

UNITED STATES PATENTS

| | | |
|---|---|---|
| 2,177,919 | Vogt | Oct. 31, 1939 |
| 2,369,765 | Waters | Feb. 20, 1945 |
| 2,373,340 | Rohdin | Apr. 10, 1945 |
| 2,380,134 | Waters | July 10, 1945 |
| 2,574,931 | Nason | Nov. 13, 1951 |
| 2,685,385 | Kuss | Aug. 3, 1954 |
| 2,831,610 | Dennie | Apr. 22, 1958 |